United States Patent
Wang et al.

(10) Patent No.: US 12,407,169 B2
(45) Date of Patent: Sep. 2, 2025

(54) ENERGY COUPLING METHOD AND SYSTEM FOR HOUSEHOLD ENERGY STORAGE

(71) Applicant: FranklinWH Energy Storage Inc., San Jose, CA (US)

(72) Inventors: Daqing Wang, Shenzhen (CN); Tao Wang, Shenzhen (CN); Gang Xiao, Shenzhen (CN); Junhua Jiang, Shenzhen (CN)

(73) Assignee: FranklinWH Energy Storage Inc., San Jose, CA (US)

( * ) Notice: Subject to any disclaimer, the term of this patent is extended or adjusted under 35 U.S.C. 154(b) by 137 days.

(21) Appl. No.: 18/464,186

(22) Filed: Sep. 8, 2023

(65) Prior Publication Data
US 2025/0088005 A1    Mar. 13, 2025

(51) Int. Cl.
| | | |
|---|---|---|
| *H02J 3/32* | (2006.01) | |
| *H02J 3/00* | (2006.01) | |
| *H02J 3/38* | (2006.01) | |
| *H02J 9/06* | (2006.01) | |
| *H02M 1/36* | (2007.01) | |

(52) U.S. Cl.
CPC .............. *H02J 3/322* (2020.01); *H02J 3/001* (2020.01); *H02J 3/38* (2013.01); *H02J 9/062* (2013.01); *H02M 1/36* (2013.01); *H02J 2300/24* (2020.01)

(58) Field of Classification Search
CPC .... H02J 3/322; H02J 3/001; H02J 3/38; H02J 9/062; H02J 2300/24; H02M 1/36
See application file for complete search history.

(56) References Cited

U.S. PATENT DOCUMENTS

| | | | |
|---|---|---|---|
| 9,373,965 B2 | 6/2016 | Liu et al. | |
| 10,705,496 B2 | 7/2020 | Son et al. | |
| 11,945,330 B2* | 4/2024 | Salter | B60L 50/60 |
| 2024/0006888 A1* | 1/2024 | Wang | H02J 3/381 |
| 2025/0070561 A1* | 2/2025 | Mohamed | B60L 55/00 |

* cited by examiner

*Primary Examiner* — Daniel Kessie
*Assistant Examiner* — Brian K Baxter
(74) *Attorney, Agent, or Firm* — ANOVA LAW GROUP, PLLC (57) ABSTRACT

An energy coupling method for household energy storage includes: connecting an alternate current (AC) output from an electric vehicle (EV) to a household electricity grid through an AC-to-AC power converter capable of outputting a vehicle-to-load (V2L) AC power that is synchronized to the household electricity grid; in response to an outage of an electricity grid that supplies power to the household grid, turning on the AC-to-AC power converter to supply the V2L AC power to a household load connected to the household electricity grid; and in response to a recovery of the electricity grid, turning off the AC-to-AC power converter to stop outputting the V2L AC power.

18 Claims, 10 Drawing Sheets

ENERGY COUPLING METHOD AND SYSTEM FOR HOUSEHOLD ENERGY STORAGE

TECHNICAL FIELD

The present disclosure relates to the technical field of household energy storage technologies and, more particularly, to an energy coupling method and system for household energy storage.

BACKGROUND

A household energy storage system stores electricity generated from a renewable energy source such as solar panels or received from the electricity grid at a lower electricity rate, provides backup power during electricity grid outage, and minimizes energy cost by using stored energy during peak demand periods. The household energy storage system includes rechargeable batteries and an energy management system that provides interconnection or coupling for the batteries, the renewable energy sources, the electricity grid, and household loads, thereby forming a household electricity grid or a micro-grid. The household energy storage system monitors status of the electricity grid and controls the operations of all the parts of the micro-grid for various application scenarios.

Large capacity batteries are needed to provide sufficient backup power during the electricity grid outage. Due to high cost of the batteries, a typical household energy storage system may provide the backup power to the household loads for a few hours. Recent surge of electric vehicles (EVs) makes it possible to expand the capacity of the household energy storage system by coupling the EV batteries into the household energy storage system. The present disclosure provides an energy coupling method and system for household energy storage.

SUMMARY

One aspect of the present disclosure provides an energy coupling method for household energy storage. The energy coupling method includes: connecting an alternate current (AC) output from an electric vehicle (EV) to a household electricity grid through an AC-to-AC power converter capable of outputting a vehicle-to-load (V2L) AC power that is synchronized to the household electricity grid; in response to an outage of an electricity grid that supplies power to the household grid, turning on the AC-to-AC power converter to supply the V2L AC power to a household load connected to the household electricity grid; and in response to a recovery of the electricity grid, turning off the AC-to-AC power converter to stop outputting the V2L AC power.

Another aspect of the present disclosure provides an energy coupling system for household energy storage. The energy coupling system includes an energy management system (EMS). The EMS includes one or more processors and one or more memories storing program instructions that when executed by the one or more processors, cause the one or more processors to: connect an alternate current (AC) output from an electric vehicle (EV) to a household electricity grid through an AC-to-AC power converter capable of outputting a vehicle-to-load (V2L) AC power that is synchronized to the household electricity grid; in response to an outage of an electricity grid that supplies power to the household grid, turn on the AC-to-AC power converter to supply the V2L AC power to a household load connected to the household electricity grid; and in response to a recovery of the electricity grid, turn off the AC-to-AC power converter to stop outputting the V2L AC power.

Other aspects of the present disclosure can be understood by those skilled in the art in light of the description, the claims, and the drawings of the present disclosure.

BRIEF DESCRIPTION OF THE DRAWINGS

To more clearly illustrate the technical solutions in embodiments of the present disclosure, the drawings used in the description of the disclosed embodiments are briefly described hereinafter. Other drawings may be derived from such drawings by a person with ordinary skill in the art without creative efforts and may be encompassed in the present disclosure.

DETAILED DESCRIPTION OF THE EMBODIMENTS

Technical solutions of the present disclosure will be described below with reference to the accompanying drawings. It should be understood that the embodiments are provided to enable a more thorough understanding of the present disclosure and to fully convey the scope of the present disclosure to those skilled in the art, and the present disclosure can be implemented in various forms and should not be limited by the embodiments set forth herein.

Homes are often powered by a household electricity grid. The household electricity grid is connected to an electricity grid of a utility company (also referred to as utility grid or grid) that supplies electricity power to the homes. The household electricity grid may include components capable of providing a backup power when an outage of the electricity grid occurs.

Figure 1:
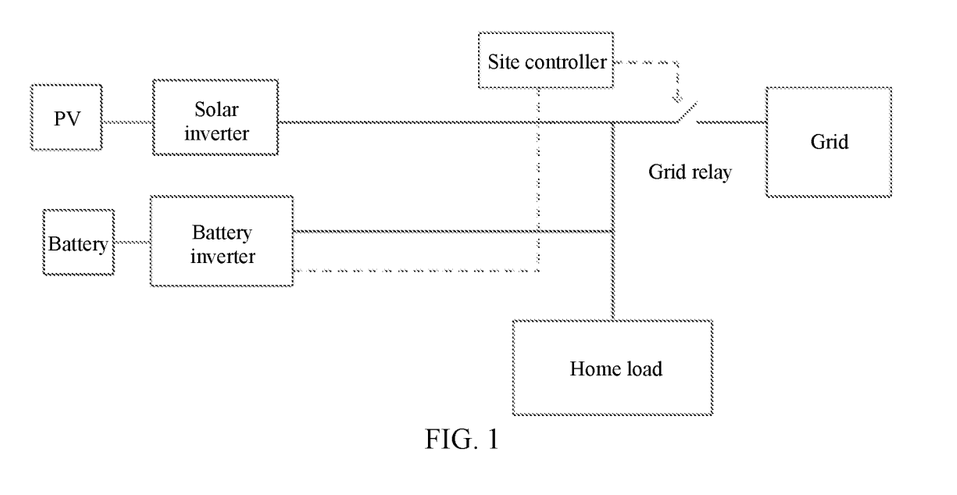
FIG. 1 is a schematic diagram of an exemplary household electricity grid according to some embodiments of the present disclosure.

FIG. 1 illustrates a schematic diagram of an exemplary household electricity grid according to some embodiments of the present disclosure. As shown in FIG. 1, the household electricity grid includes a battery energy storage system (BESS) and a solar power generator. The BESS includes a battery that stores electricity energy and a battery inverter that converts a direct current (DC) power released from the battery into an alternating current (AC) power to be supplied to the household electricity grid. The solar power generator includes solar panels or photovoltaic (PV) cells that generate a DC power and a solar inverter that converts the generated DC power into another AC power to be supplied to the household electricity grid.

As shown in FIG. 1, the household electricity grid also includes a site controller, also referred to as an energy management system (EMS), that is configured to monitor and control various components of the household electricity grid. In one example, the EMS controls a grid relay to disconnect the household electricity grid from the electricity grid when an outage of the electricity grid occurs, and controls the grid relay to re-connect the household electricity grid to the electricity grid when the electricity grid recovers. In another example, after the EMS disconnects the household electricity grid from the electricity grid in response to an outage of the electricity grid, the EMS controls the BESS to supply the backup AC power to a home load (also referred to as a household load) that is connected to the household electricity grid. The household load may include HVAC, various appliances, smart home devices, computers, and medical devices, etc. In another example, the EMS controls the BESS to supply the backup AC power to the electricity grid through the household electricity grid to make money for the home owner.

Figure 2:
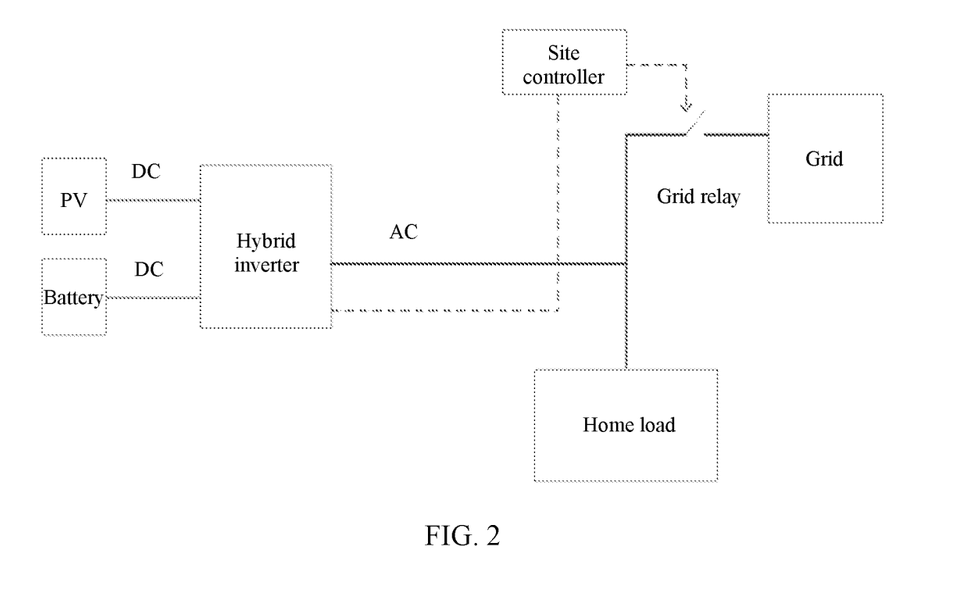
FIG. 2 is a schematic diagram of another exemplary household electricity grid according to some embodiments of the present disclosure.

FIG. 2 illustrates a schematic diagram of another exemplary household electricity grid according to some embodiments of the present disclosure. As shown in FIG. 2, the BESS and the solar power generator are integrated together, such that the DC power generated from the PV cells can directly charge the battery without going through the invertors and the household electricity grid, thereby improving efficiency.

Figure 3:
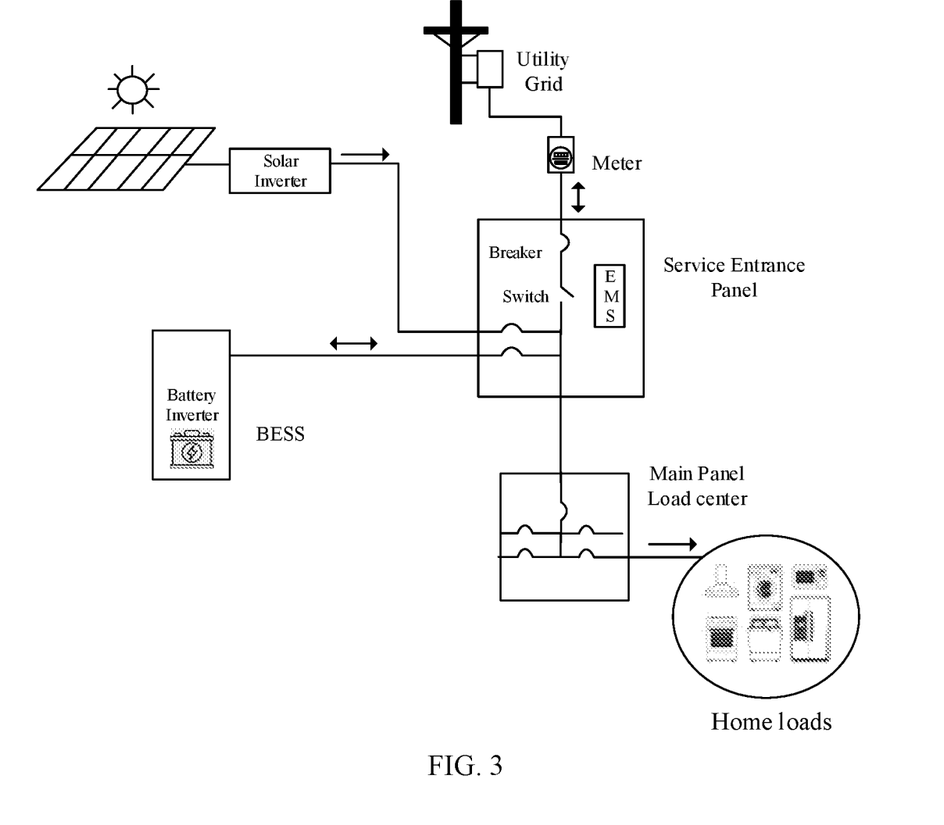
FIG. 3 is a schematic diagram showing physical connections of an exemplary household electricity grid according to some embodiments of the present disclosure.

FIG. 3 illustrates a schematic diagram showing physical connections of an exemplary household electricity grid according to some embodiments of the present disclosure. As shown in FIG. 3, the electricity grid or the utility grid is connected to the household electricity grid through an electricity meter. For example, the electricity meter measures the electricity energy flow from the electricity grid into the household electricity grid in a consumption mode, and measures the electricity energy flow from the household electricity grid into the electricity grid in a generation mode. The household electricity grid is connected to the electricity meter through a service entrance panel. The service entrance panel connects to various components of the household electricity grid.

As shown in FIG. 3, the EMS and the grid relay are located at the service entrance panel. At each connection, a circuit breaker is provided to protect against faults such as over-current or short circuit. A main panel load center, commonly known as a circuit breaker panel, is provided to distribute electricity to the household load or home loads. Similarly, circuit breakers are provided to protect against various faults.

Figure 4:
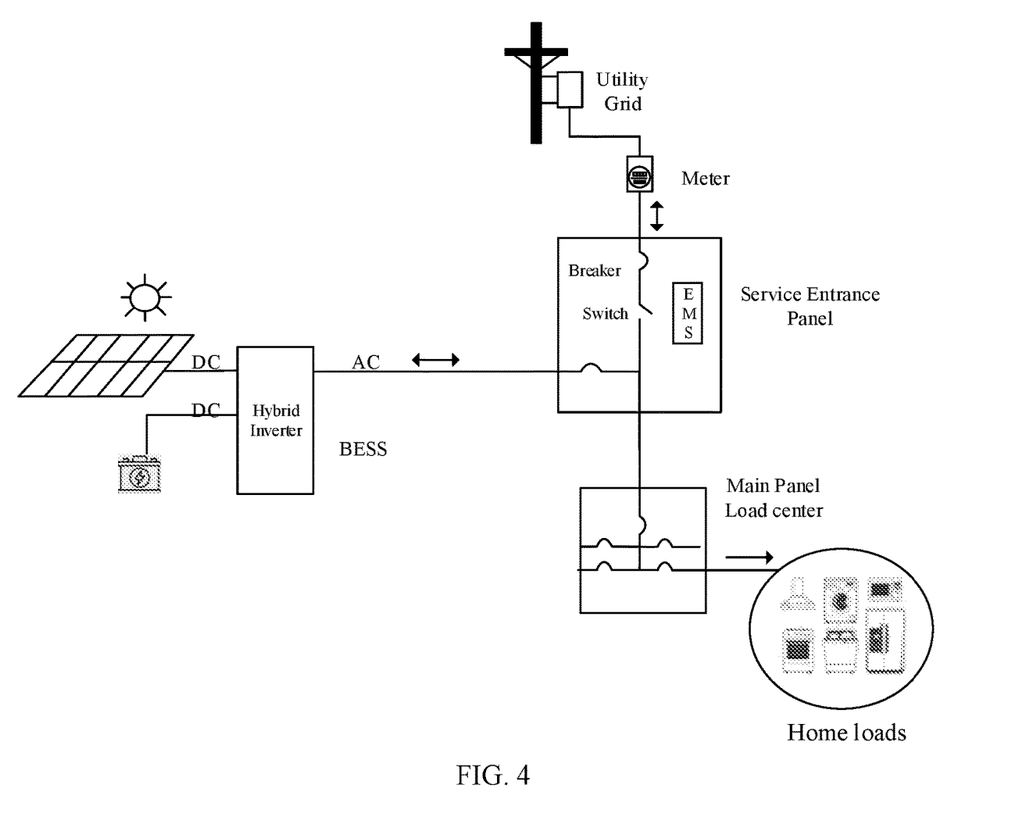
FIG. 4 is a schematic diagram showing physical connections of another exemplary household electricity grid according to some embodiments of the present disclosure.

FIG. 4 illustrates a schematic diagram showing physical connections of another exemplary household electricity grid according to some embodiments of the present disclosure. As shown in FIG. 4, the BESS and the solar power generator are integrated together, such that the DC power generated from the PV cells can directly charge the battery without going through the inverters and the household electricity grid, thereby improving efficiency. Other than the integration of the BESS and the solar power generator, the physical connections in the household electricity grid in FIG. 4 remain the same as in FIG. 3.

When estimating a size of the battery of the BESS, a trade-off between battery cost and a backup duration are considered. The battery with a larger capacity provides a longer backup duration, but the battery cost of the battery with the larger capacity is higher. Generally, the size of the battery of the BESS only allows a couple of hours backup duration. When adverse weather with limited sun exposure coincides with the outage of the electricity grid, the BESS can only supply the backup power to the household load for a less than desired backup duration. Thus, the combination of the BESS and the solar power generator is ineffective in the scenario of extended outage of the electricity grid.

The recent surge of the adoption of the EVs makes it possible to incorporate the energy stored in the battery of an EV into the household electricity grid to extend the backup duration of the household electricity grid. The EVs provide a vehicle-to-load (V2L) function that supplies an AC power to loads such as appliances, lights, smart home devices, and computers, etc.

Figure 5:
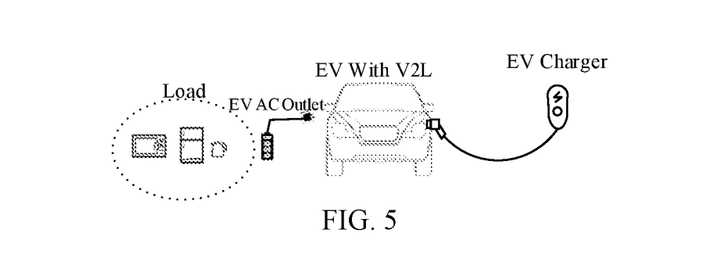
FIG. 5 is a schematic diagram showing an exemplary EV supplying an AC power in a vehicle-to-load (V2L) mode according to some embodiments of the present disclosure.

FIG. 5 illustrates a schematic diagram showing an exemplary EV supplying an AC power in a vehicle-to-load (V2L) mode according to some embodiments of the present disclosure. As shown in FIG. 5, the EV directly supplies the AC power to the loads. Many EVs available in the market support the V2L function. For example, the EVs supporting the V2L function include Hyundai Ioniq 5, KIA EV6, BYD Atto 3, BYD Han EV, BYD Dolphin, Ford F-150 Lightning, MG ZS EV, and MG4, etc. In the V2L mode, the AC power is not synchronized to either the electricity grid or the household electricity grid. In other words, the AC power cannot be supplied directly to the household electricity grid.

Figure 6:
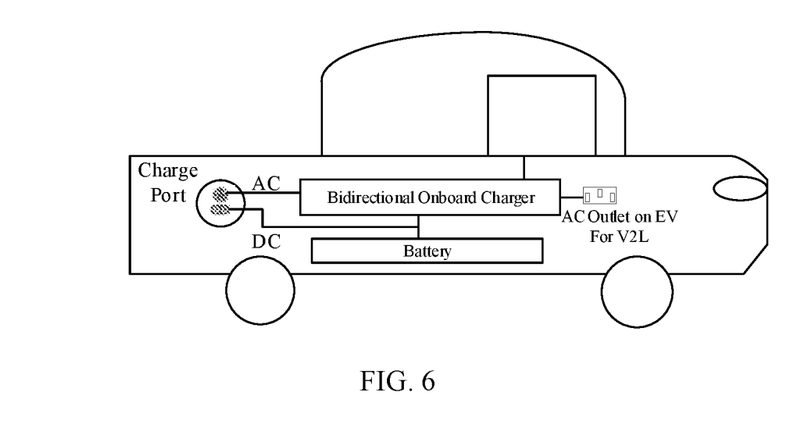
FIG. 6 is a schematic diagram showing internal components of an exemplary EV supplying the AC power in the V2L mode according to some embodiments of the present disclosure.

FIG. 6 illustrates a schematic diagram showing internal components of an exemplary EV supplying the AC power in the V2L mode according to some embodiments of the present disclosure. As shown in FIG. 6, the EV includes a bidirectional onboard charger. In the V2L mode, the bidirectional onboard charger converts the energy stored in the battery of the EV into the AC power available at an AC outlet on the EV. In an EV charging mode, the bidirectional onboard charger converts an AC charging power into a DC charging power to charge the battery of the EV. The bidirectional onboard charger is not needed in the EVs that do not provide the V2L function.

Figure 7:
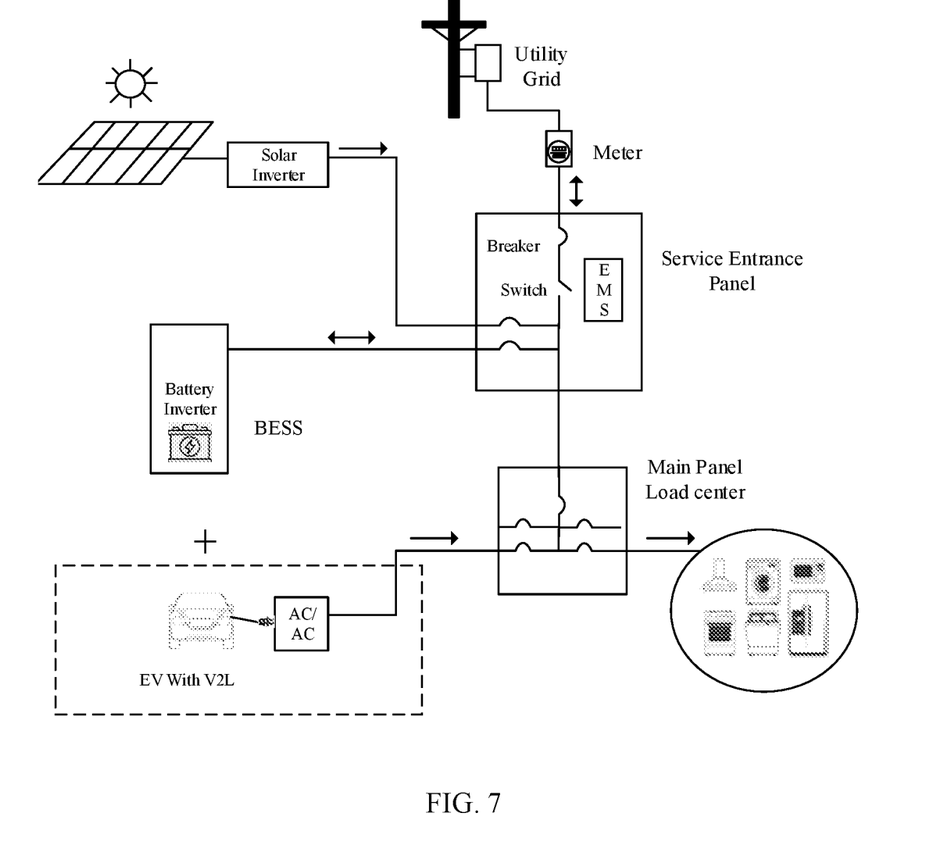
FIG. 7 is a schematic diagram showing connecting an EV into a household electricity grid through an AC-to-AC converter according to some embodiments of the present disclosure.

FIG. 7 is a schematic diagram showing connecting an EV into a household electricity grid through an AC-to-AC converter according to some embodiments of the present disclosure. Because the AC power from the EV in the V2L mode cannot be supplied directly into the household electricity grid, an AC-to-AC converter is provided to convert the AC power into a V2L AC power that is synchronized to the household electricity grid.

Generally, the energy stored in the battery of an EV may be substantially more than the energy stored in the battery of a BESS. For example, the battery of the BESS may supply the backup power to the household load for a couple of hours, and the battery of the EV may supply the backup power to the household load for a couple of days. After the EV is connected to the household electricity grid through the AC-to-AC converter, the energy stored in the battery of the EV can be combined with the energy stored in the battery of the BESS to extend the backup duration in response to the outage of the electricity grid or to feed the stored energy back to the electricity grid to make a profit and stabilize the operation of the electricity grid during peak hours.

Figure 8:
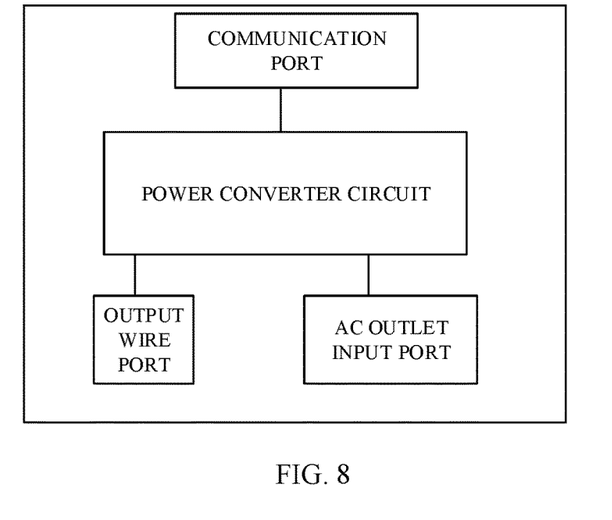
FIG. 8 is a schematic block diagram of an exemplary AC-to-AC converter according to some embodiments of the present disclosure.

FIG. 8 is a schematic block diagram of an exemplary AC-to-AC converter according to some embodiments of the present disclosure. As shown in FIG. 8, the AC-to-AC converter (also referred to as AC-to-AC power converter) includes an input terminal (also referred to as AC outlet input port) for receiving an AC power from the EV, an output terminal (also referred to as output wire port) for connecting to the household electricity grid, a power converter circuit for converting the AC power from the EV into the V2L AC power that is synchronized to the household electricity grid, and a communication interface (also referred to as communication port) for communicating with at least one of the EMS or a smart phone application that allows a user to monitor and control the AC-to-AC converter.

The AC outlet input port is a general-purpose AC outlet that accepts a standard AC plug. The AC outlet input port is protected by a fuse. The output wire port provides terminals for connecting electrical wires. The output wire port is protected by a circuit breaker that can connect to or disconnect from the household electricity grid, and at the same time, can protect against faults such as over-current or short circuit. The communication port allows the AC-to-AC converter to communicate with the EMS or the smart phone application that allows the user to manage the AC-to-AC converter.

The communication port may support a wired connection such as an RS-485 connection, a controller area network (CAN) connection, and an Ethernet connection, or a wireless connection such as a Wi-Fi connection, a Bluetooth connection, and a mobile communication network connection. The communication port may support other suitable network connections.

Figure 9:
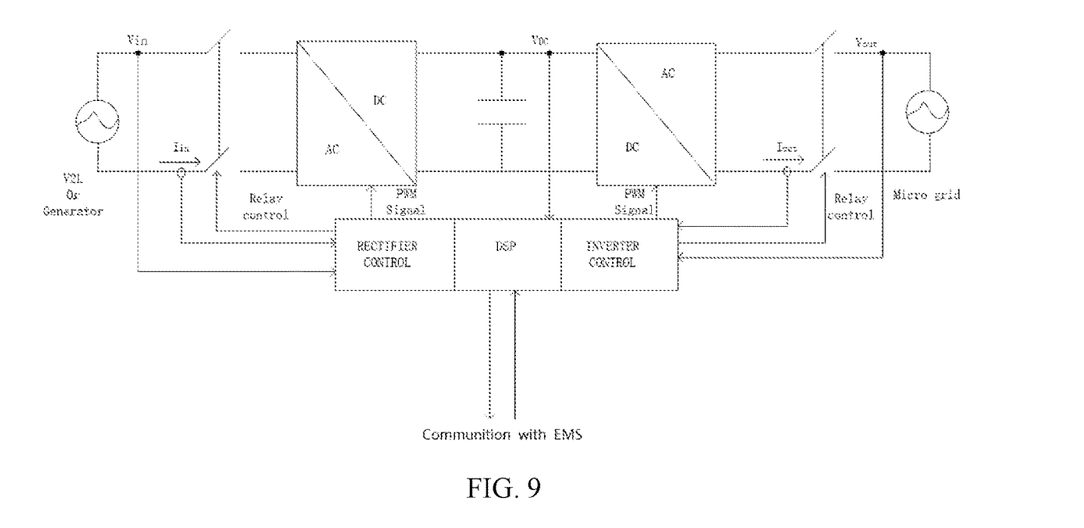
FIG. 9 is a schematic diagram showing internal components of an exemplary AC-to-AC converter according to some embodiments of the present disclosure.

FIG. 9 is a schematic diagram showing internal components of an exemplary AC-to-AC converter according to some embodiments of the present disclosure. As shown in FIG. 9, the AC-to-AC converter includes a rectifier that converts an AC power into a DC power, an inverter that converts a DC power into an AC power, and a digital signal processor (DSP) that controls the operation of the AC-to-AC converter and communicates with the EMS and the smart phone application. The DSP maintains a voltage of an intermediate DC signal between the rectifier and the inverter within a limited range. The DSP also monitors the AC signal at the AC outlet input port. When a voltage of the AC signal drops below a predetermined voltage threshold or a frequency of the AC signal drops below a predetermined frequency threshold, the DSP automatically reduces a power rating at the output wire port.

The AC-to-AC converter converts the AC power from the EV into the V2L AC power that can be supplied to the household electricity grid. The DSP controls the frequency and phase of the V2L AC power to synchronize with the frequency and phase of an existing AC power in the household electricity grid. The AC-to-AC converter can be turned on or off in response to commands received from the EMS and/or the smart phone application through the communication port. The AC-to-AC converter can be controlled to supply the V2L AC power to the household load, charge the battery of the BESS, or feed back to the electricity grid.

The AC-to-AC converter supports multiple communication protocols. For example, the AC-to-AC converter may connect to a Wi-Fi router through an Ethernet cable or a Wi-Fi connection. The homeowner may communicate with the AC-to-AC converter through a web browser or a smart phone application to monitor and control the operation of the AC-to-AC converter. The homeowner may communicate directly with the AC-to-AC converter or indirectly through the EMS.

To monitor and control the AC-to-AC converter, at least one of the EMS or the smart phone application may send commands to the AC-to-AC converter to perform one or more operations including turning on the AC-to-AC power converter, turning off the AC-to-AC power converter, controlling an output power, retrieving the output power, retrieving an amplitude and a frequency of the AC output from the electric vehicle, retrieving an amplitude and a frequency of the V2L AC power, retrieving a current value of the AC output from the electric vehicle, retrieving a current value of the V2L AC power, and retrieving alarms of the AC-to-AC power converter. Other suitable commands may also be supported by the EMS, the smart phone application, and the AC-to-AC converter.

In the embodiments of the present disclosure, the energy stored in the battery of the EV is coupled into the household electricity grid through the AC-to-AC converter to extend the backup duration in response to the outage of the electricity grid or to feed the stored energy back to the electricity grid for profit and stabilizing the operation of the electricity grid.

The present disclosure provides an energy coupling method for household energy storage. The method allows the energy stored in the battery of the EV to be coupled into the household electricity grid through the AC-to-AC converter. The coupled energy may be used as the backup AC power during the outage of the electricity grid or the generated AC power feeding into the electricity grid for profit or stabilizing the operation of the electricity grid during peak demand hours.

Figure 10:
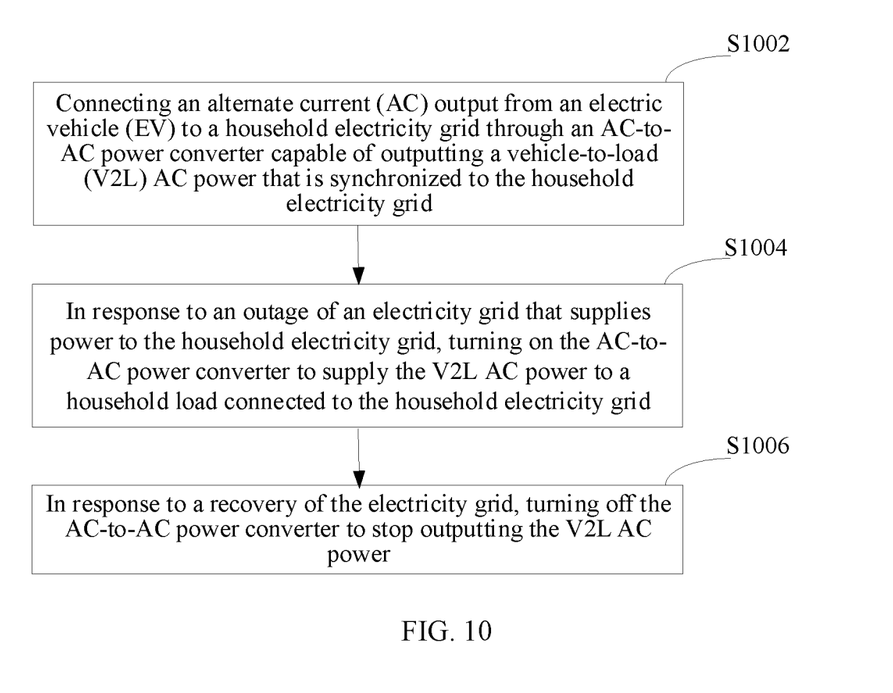
FIG. 10 is a flowchart of an exemplary energy coupling method for household energy storage according to some embodiments of the present disclosure.

FIG. 10 is a flowchart of an exemplary energy coupling method for household energy storage according to some embodiments of the present disclosure. As shown in FIG. 10, the energy coupling method includes the following processes.

At S1002, an alternate current (AC) output from an electric vehicle (EV) is connected to a household electricity grid through an AC-to-AC power converter capable of outputting a vehicle-to-load (V2L) AC power that is synchronized to the household electricity grid.

In some embodiments, to couple the energy stored in the battery of the EV into the household electricity grid, the AC power outputted from the EV is connected to the household electricity grid through the AC-to-AC power converter. The AC-to-AC power converter is capable of converting the AC power outputted from the EV into the V2L AC power that is synchronized to the household electricity grid. In other words, the frequency and phase of the V2L AC power track closely to the frequency and phase of the existing AC power in the household electricity grid. As previously described, the output terminal of the AC-to-AC power converter are connected to the main panel load center or the circuit breaker panel shown in FIG. 7, using electrical wires. By default, no V2L AC power is supplied to the household electricity grid.

At S1004, in response to an outage of an electricity grid that supplies power to the household electricity grid, the AC-to-AC power converter is turned on to supply the V2L AC power to a household load connected to the household electricity grid.

In some embodiments, when the outage of the electricity grid occurs, the AC-to-AC power converter that is physically connected to the household electricity grid is turned on to supply the V2L AC power to the household load through the household electricity grid. In this case, the V2L AC power has already been synchronized to the household electricity grid.

At S1006, in response to a recovery of the electricity grid, the AC-to-AC power converter is turned off to stop outputting the V2L AC power.

In some embodiments, when the recovery of the electricity grid occurs, the AC-to-AC power converter is turned off to stop supplying the V2L AC power to the household load through the household electricity grid.

In some embodiments, the household electricity grid includes an energy management system (EMS), and the EMS is configured to: monitor whether the outage of the electricity grid occurs; in response to the outage of the electricity grid, disconnect the household electricity grid from the electricity grid, and turn on the AC-to-AC power converter to supply the V2L AC power to the household electricity grid; and in response to the recovery of the electricity grid, re-connect the household electricity grid to the electricity grid, and turn off the AC-to-AC power converter to stop supplying the V2L AC power to the household electricity grid.

In some embodiments, the household electricity grid further includes a battery energy storage system (BESS), and the EMS is further configured to: monitor whether the outage of the electricity grid occurs; in response to the outage of the electricity grid, disconnect the household electricity grid from the electricity grid, turn on the AC-to-AC power converter to supply the V2L AC power to the household electricity grid, and control the BESS to supply a backup AC power to the household electricity grid; and in response to the recovery of the electricity grid, re-connect the household electricity grid to the electricity grid, turn off the AC-to-AC power converter to stop supplying the V2L AC power to the household electricity grid, and control the BESS to stop supplying the backup AC power to the household electricity grid.

In some embodiments, turning on the AC-to-AC power converter to supply the V2L AC power to the household electricity grid, and controlling the BESS to supply the backup AC power to the household electricity grid includes: obtaining an amount of energy stored in the battery of the EV and an amount of energy stored in the battery of the BESS; based on the amount of energy stored in the battery of the EV and the amount of energy stored in the battery of the BESS, optimizing an output rate of the V2L AC power and an output rate of the backup AC power, such that the amount of energy stored in the battery of the EV and the amount of energy stored in the battery of the BESS are discharged in an equal amount of time, respectively; and based on the optimized output rate of the V2L AC power and the optimized output rate of the backup AC power, supplying the V2L AC power and the backup AC power to the household electricity grid.

In some embodiments, the household electricity grid further includes a solar power generator that is configured to supply a solar generated AC power to the household electricity grid. Similarly, the solar generated AC power needs to be synchronized to the existing AC power in the household electricity grid before being supplied to the household electricity grid.

In some embodiments, the EMS is further configured to: in response to the recovery of the electricity grid, re-connect the household electricity grid to the electricity grid, turn off the AC-to-AC power converter to stop supplying the V2L AC power to the household electricity grid, and control the BESS to receive power from the household electricity grid to charge batteries of the BESS.

In some embodiments, the EMS communicates with the AC-to-AC power converter, the BESS, and the solar power generator through at least one of an Ethernet connection, a controller area network (CAN) bus, an RS-485 serial control bus, a Wi-Fi connection, or a Bluetooth connection. The EMS communicates with a smart phone application through at least one of the Ethernet connection, the Wi-Fi connection, or a mobile network connection, the smart phone application allowing a user to manage the household electricity grid.

In some embodiments, the AC-to-AC power converter includes an input terminal for receiving the AC output from the EV, an output terminal for connecting to the household electricity grid, a power converter circuit for converting the AC output from the EV into the V2L AC power that is synchronized to the household electricity grid, and a communication interface for communicating with at least one of the EMS or the smart phone application.

In some embodiments, at least one of the EMS or the smart phone application controls the AC-to-AC power converter to perform one or more operations including: turning on the AC-to-AC power converter; turning off the AC-to-AC power converter; controlling an output power; retrieving the output power; retrieving an amplitude and a frequency of the AC output from the electric vehicle; retrieving an amplitude and a frequency of the V2L AC power; retrieving a current value of the AC output from the electric vehicle; retrieving a current value of the V2L AC power; and retrieving alarms of the AC-to-AC power converter.

In some embodiments, the energy coupling method further includes: turning on the AC-to-AC power converter to supply the V2L AC power to the electricity grid through the household electricity grid. In this case, the homeowner makes a profit and also helps stabilize the electricity grid during the peak demand hours.

In the embodiments of the present disclosure, the energy stored in the battery of the EV is coupled into the household electricity grid through the AC-to-AC converter to extend the backup duration in response to the outage of the electricity grid or to feed the stored energy back to the electricity grid for profit and stabilizing the operation of the electricity grid.

The present disclosure further provides an energy coupling system for household energy storage.

Figure 11:
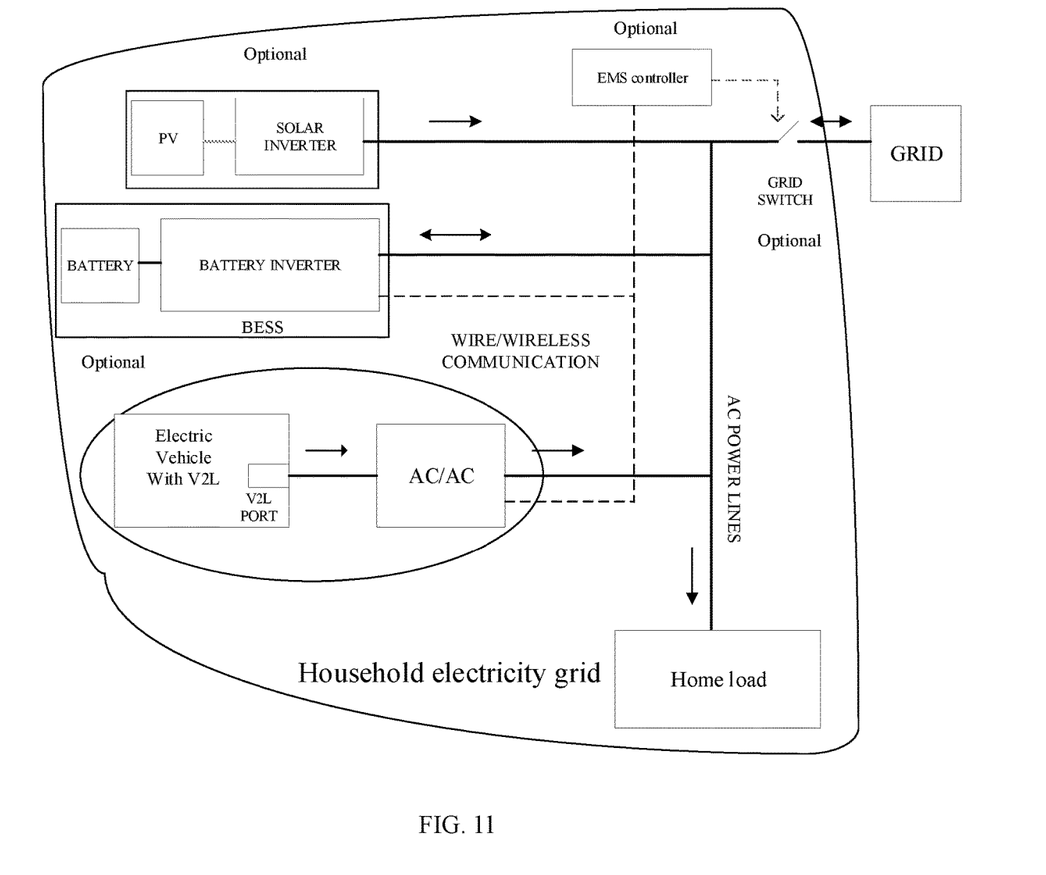
FIG. 11 is a schematic diagram of an exemplary energy coupling system for household energy storage according to some embodiments of the present disclosure.

FIG. 11 is a schematic diagram of an exemplary energy coupling system for household energy storage according to some embodiments of the present disclosure. As shown in FIG. 11, the energy coupling system includes an energy management system (EMS). The EMS includes one or more processors and one or more memories storing program instructions that when executed by the one or more processors, cause the one or more processors to: connect an alternate current (AC) output from an electric vehicle (EV) to a household electricity grid through an AC-to-AC power converter capable of outputting a vehicle-to-load (V2L) AC power that is synchronized to the household electricity grid; in response to an outage of an electricity grid that supplies power to the household grid, turn on the AC-to-AC power converter to supply the V2L AC power to a household load connected to the household electricity grid; and in response to a recovery of the electricity grid, turn off the AC-to-AC power converter to stop outputting the V2L AC power.

In some embodiments, the one or more processors may include any appropriate hardware processor or processors. Further, the one or more processors can include multiple cores for multi-thread or parallel processing and can include graphics capability for processing for a human-machine interface (HMI) (i.e., an example of input/output devices 910). The one or more memories may include any appropriate memory modules, such as ROM, RAM, flash memory modules, and erasable and rewritable memory, and mass storages, such as CD-ROM, DVD, U-disk, and hard disk, etc.

In some embodiments, the EMS may further include a communication interface. For example, the communication interface is configured to enable the EMS to communicate with the BESS, the solar power generator, and the AC-to-AC converter to monitor and control the operations of the household electricity grid.

In some embodiments, the EMS may further include input/output devices. The input/output devices may include any appropriate input devices to input information to the one or more processors and/or output devices to output information from the one or more processors, such as keypads, keyboards, and mouse devices, cameras, microphones, and other sensors. The input/output devices may allow the homeowner to enter commands to configure parameters that are needed for the operations of the household electricity grid.

In some embodiments, the EMS may further include a data storage device. The data storage device may include one or more data storage devices for storing certain data and for performing certain operations on the stored data, such as database searching, operation statistics calculation, etc. For example, the EMS may adjust schedules of charging and discharging the battery of the BESS and determine the energy sources for charging and discharging the battery of the BESS based on homeowner's schedule and local weather forecast, etc. Due to limited memory size of the EMS, the operation data collected from the household electricity grid may be uploaded to a cloud server for further data processing. For example, the utility service providers may use the operation data aggregated from a plurality of household electricity grid to perform dynamic load balancing. The data storage device may store the program instructions that implement the energy coupling method provided by the embodiments of the present disclosure.

In some embodiments, the EMS may further include a display. The display may be any suitable display technology suitable to display an image or a video. For example, the display may include a liquid crystal display (LCD) screen, an organic light-emitting diode (OLED) screen, or the like, and may be a touch screen.

In some other embodiments, the EMS may include other suitable devices.

The energy coupling system implements the disclosed energy coupling method. For detailed description of the operation of the energy coupling method, references can be made to the description of the energy coupling method, and the detailed description thereof will be omitted herein.

In the embodiments of the present disclosure, the energy stored in the battery of the EV is coupled into the household electricity grid through the AC-to-AC converter to extend the backup duration in response to the outage of the electricity grid or to feed the stored energy back to the electricity grid for profit and stabilizing the operation of the electricity grid.

The embodiments of the present disclosure are further described in more application scenarios as follows.

Figure 12:
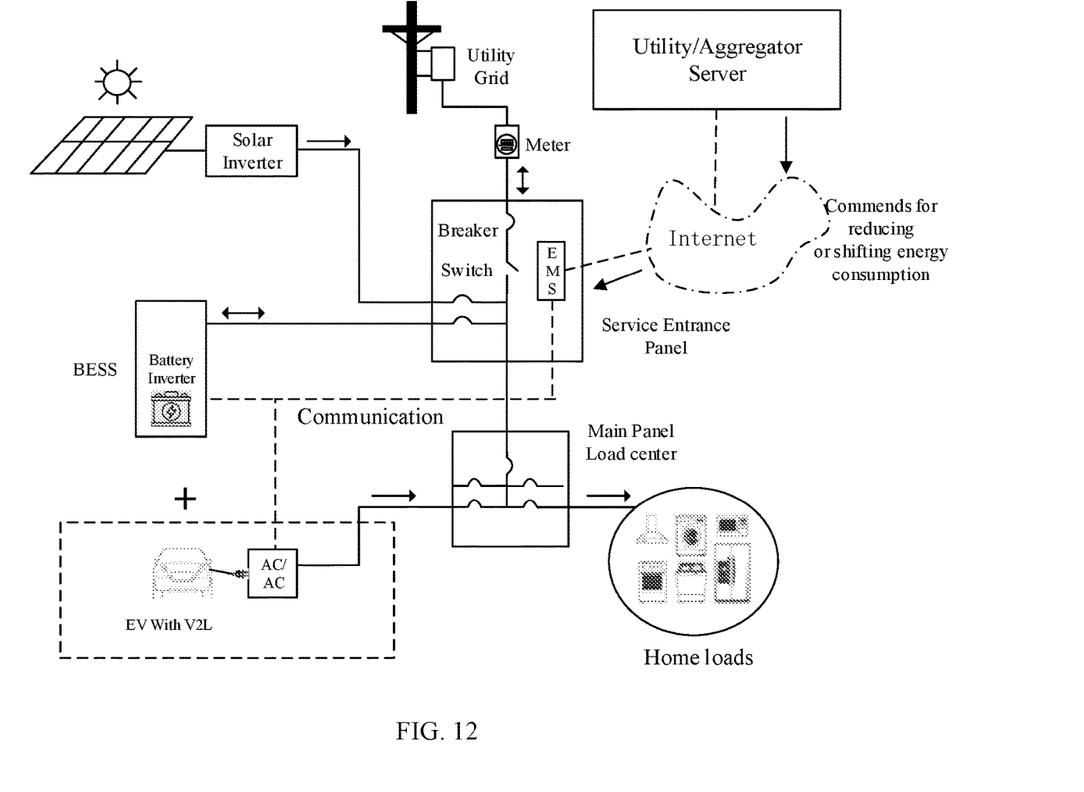
FIG. 12 is a schematic diagram of another exemplary energy coupling system for household energy storage according to some embodiments of the present disclosure.

FIG. 12 is a schematic diagram of another exemplary energy coupling system for household energy storage according to some embodiments of the present disclosure. As shown in FIG. 12, the energy coupling system includes a household electricity grid. The household electricity grid includes an EMS located at a service entrance panel, a BESS connected to the service entrance panel, a solar power generator connected to the service entrance panel, an EV connected to a main panel load center through an AC-to-AC converter, and home loads connected to the main panel load center. The household electricity grid is connected to the electricity grid or utility grid through an electricity meter. The main panel load center is connected to the service entrance panel. For the descriptions of these components of the household electricity grid, references can be made to the previous descriptions thereof.

In some embodiments, as shown in FIG. 12, a utility/aggregator server is connected to the EMS through a communication network connection. The communication network connection may include a home Wi-Fi network connection and an Internet service provider network connection or a mobile phone network connection. The utility/aggregator server may send electricity demand control commands for reducing or shifting energy consumption to the EMS through the communication network connection. Based on the electricity demand control commands, the EMS generates control commands for controlling the BESS and the AC-to-AC converter to receive and/or supply AC powers to the electricity grid through the household electricity grid. In this application scenario, the electricity grid operates the household electricity grid as a virtual power plant, thereby achieving the V2L function.

Figure 13:
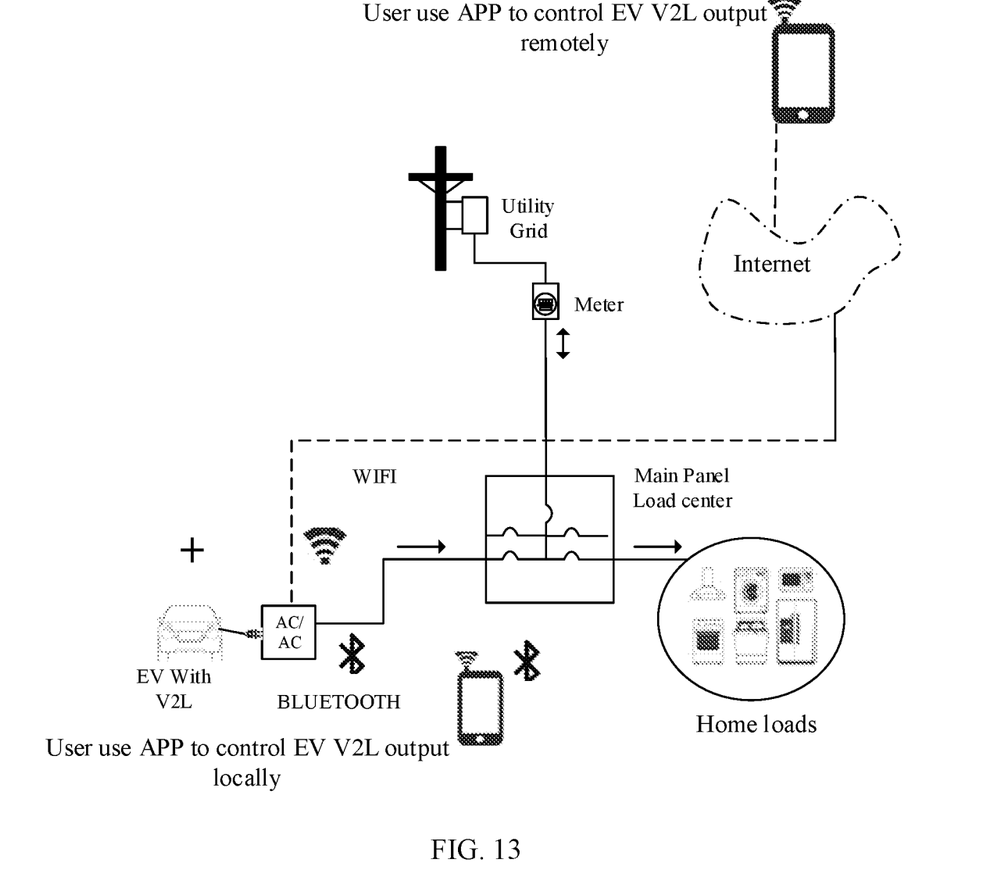
FIG. 13 is a schematic diagram of another exemplary energy coupling system for household energy storage according to some embodiments of the present disclosure.

FIG. 13 is a schematic diagram of another exemplary energy coupling system for household energy storage according to some embodiments of the present disclosure. As shown in FIG. 13, the energy coupling system includes a household electricity grid. The household electricity grid includes an EV connected to a main panel load center through an AC-to-AC converter, and home loads connected to the main panel load center. The household electricity grid is connected to the electricity grid or utility grid through an electricity meter. The main panel load center is connected to the electricity meter. For the descriptions of these components of the household electricity grid, references can be made to the previous descriptions thereof.

In some embodiments, as shown in FIG. 13, a user uses a web browser or a smart phone application to monitor and control the V2L function of the combination of the EV and the AC-to-AC converter remotely through the communication network connection or locally through a Bluetooth connection or a home Wi-Fi connection. The user may send the electricity demand control commands for reducing or shifting energy consumption to the AC-to-AC converter through the web browser or the smart phone application. Based on the electricity demand control commands, the AC-to-AC converter performs the operation for receiving and/or supplying the V2L AC power to the electricity grid through the household electricity grid. In this application scenario, the user operates the household electricity grid as a virtual power plant, thereby achieving the V2L function.

In the embodiments of the present disclosure, the energy stored in the battery of the EV is coupled into the household electricity grid through the AC-to-AC converter to extend the backup duration in response to the outage of the electricity grid or to feed the stored energy back to the electricity grid for profit and stabilizing the operation of the electricity grid.

The foregoing embodiments describe in detail the objective, the technical solution, and the beneficial effect of the present disclosure. The foregoing disclosed embodiments are only some of the embodiments of the present disclosure rather than all of the embodiments of the present disclosure, which should not be used to limit the scope of present disclosure. Other embodiments obtained by those having ordinary skills in the art on the basis of the described embodiments without inventive efforts should fall within the scope of the present disclosure. Further, under circumstances of no conflict, embodiments and features in the embodiments may be combined with each other. Therefore, any changes, equivalent replacements, and modifications made according to the present disclosure still fall within the scope of the present disclosure.

What is claimed is:

1. An energy coupling method for household energy storage, comprising:
   connecting an alternate current (AC) output from an electric vehicle (EV) to a household electricity grid through an AC-to-AC power converter, the AC-to-AC power converter being capable of outputting a vehicle-to-load (V2L) AC power that is synchronized to the household electricity grid, wherein the household electricity grid includes an energy management system (EMS) and a battery energy storage system (BESS);
   in response to an outage of an electricity grid that supplies power to the household electricity grid, turning on the AC-to-AC power converter to supply the V2L AC power to a household load connected to the household electricity grid and controlling the BESS to supply a backup AC power to the household electricity grid by the EMS, by performing:
      obtaining an amount of energy stored in the battery of the EV and an amount of energy stored in the battery of the BESS;
      based on the amount of energy stored in the battery of the EV and the amount of energy stored in the battery of the BESS, determining an output rate of the V2L AC power and an output rate of the backup AC power, such that the amount of energy stored in the battery of the EV and the amount of energy stored in the battery of the BESS are discharged in an equal amount of time, respectively; and
      based on the determined output rate of the V2L AC power and the determined output rate of the backup AC power, supplying the V2L AC power and the backup AC power to the household electricity grid; and
   in response to a recovery of the electricity grid, turning off the AC-to-AC power converter to stop outputting the V2L AC power.

2. The energy coupling method according to claim 1, further comprising:
   monitoring whether the outage of the electricity grid occurs;
   in response to the outage of the electricity grid, disconnecting the household electricity grid from the electricity grid; and
   in response to the recovery of the electricity grid, reconnecting the household electricity grid to the electricity grid, and turning off the AC-to-AC power converter to stop supplying the V2L AC power to the household electricity grid.

3. The energy coupling method according to claim 2, further comprising:
   in response to the recovery of the electricity grid, controlling the BESS to stop supplying the backup AC power to the household electricity grid.

4. The energy coupling method according to claim 1, wherein:
   the household electricity grid further includes a solar power generator that is configured to supply a solar generated AC power to the household electricity grid.

5. The energy coupling method according to claim 4, wherein the EMS is further configured to:
   in response to the recovery of the electricity grid, reconnect the household electricity grid to the electricity grid, turn off the AC-to-AC power converter to stop supplying the V2L AC power to the household electricity grid, and control the BESS to receive power from the household electricity grid to charge batteries of the BESS.

6. The energy coupling method according to claim 4, wherein:
   the EMS communicates with the AC-to-AC power converter, the BESS, and the solar power generator through at least one of an Ethernet connection, a controller area network (CAN) bus, an RS-485 serial control bus, a Wi-Fi connection, or a Bluetooth connection; and
   the EMS communicates with a smart phone application through at least one of the Ethernet connection, the Wi-Fi connection, or a mobile network connection, the smart phone application allowing a user to manage the household electricity grid.

7. The energy coupling method according to claim 6, wherein:
   the AC-to-AC power converter includes an input terminal for receiving the AC output from the EV, an output terminal for connecting to the household electricity grid, a power converter circuit for converting the AC output from the EV into the V2L AC power that is synchronized to the household electricity grid, and a communication interface for communicating with at least one of the EMS or the smart phone application.

8. The energy coupling method according to claim 7, wherein:
   at least one of the EMS or the smart phone application controls the AC-to-AC power converter to perform one or more operations including:
   turning on the AC-to-AC power converter;
   turning off the AC-to-AC power converter;
   controlling an output power;
   retrieving the output power;
   retrieving an amplitude and a frequency of the AC output from the electric vehicle;
   retrieving an amplitude and a frequency of the V2L AC power;
   retrieving a current value of the AC output from the electric vehicle;
   retrieving a current value of the V2L AC power; and
   retrieving alarms of the AC-to-AC power converter.

9. The energy coupling method according to claim 1, further comprising:
turning on the AC-to-AC power converter to supply the V2L AC power to the electricity grid through the household electricity grid.

10. An energy coupling system for household energy storage, comprising an energy management system (EMS), wherein the EMS includes one or more processors and one or more memories storing program instructions that, when being executed, cause the one or more processors to:
connect an alternate current (AC) output from an electric vehicle (EV) to a household electricity grid through an AC-to-AC power converter capable of outputting a vehicle-to-load (V2L) AC power that is synchronized to the household electricity grid;
in response to an outage of an electricity grid that supplies power to the household electricity grid, turn on the AC-to-AC power converter to supply the V2L AC power to a household load connected to the household electricity grid and control a battery energy storage system (BESS) to supply a backup AC power to the household electricity grid,
wherein the one or more processors are further configured to:
obtain an amount of energy stored in the battery of the EV and an amount of energy stored in the battery of the BESS;
based on the amount of energy stored in the battery of the EV and the amount of energy stored in the battery of the BESS, determine an output rate of the V2L AC power and an output rate of the backup AC power, such that the amount of energy stored in the battery of the EV and the amount of energy stored in the battery of the BESS are discharged in an equal amount of time, respectively; and
based on the determined output rate of the V2L AC power and the determined output rate of the backup AC power, supply the V2L AC power and the backup AC power to the household electricity grid; and
in response to a recovery of the electricity grid, turn off the AC-to-AC power converter to stop outputting the V2L AC power.

11. The energy coupling system according to claim 10, wherein the one or more processors are further configured to:
monitor whether the outage of the electricity grid occurs;
in response to the outage of the electricity grid, disconnect the household electricity grid from the electricity grid; and
in response to the recovery of the electricity grid, reconnect the household electricity grid to the electricity grid, and turn off the AC-to-AC power converter to stop supplying the V2L AC power to the household electricity grid.

12. The energy coupling system according to claim 11, wherein the one or more processors are further configured to:
in response to the recovery of the electricity grid, control the BESS to stop supplying the backup AC power to the household electricity grid.

13. The energy coupling system according to claim 10, wherein:
the household electricity grid further includes a solar power generator that is configured to supply a solar generated AC power to the household electricity grid.

14. The energy coupling system according to claim 13, wherein the one or more processors are further configured to:
in response to the recovery of the electricity grid, reconnect the household electricity grid to the electricity grid, turn off the AC-to-AC power converter to stop supplying the V2L AC power to the household electricity grid, and control the BESS to receive power from the household electricity grid to charge batteries of the BESS.

15. The energy coupling system according to claim 13, wherein:
the EMS communicates with the AC-to-AC power converter, the BESS, and the solar power generator through at least one of an Ethernet connection, a controller area network (CAN) bus, an RS-485 serial control bus, a Wi-Fi connection, or a Bluetooth connection; and
the EMS communicates with a smart phone application through at least one of the Ethernet connection, the Wi-Fi connection, or a mobile network connection, the smart phone application allowing a user to manage the household electricity grid.

16. The energy coupling system according to claim 15, wherein:
the AC-to-AC power converter includes an input terminal for receiving the AC output from the EV, an output terminal for connecting to the household electricity grid, a power converter circuit for converting the AC output from the EV into the V2L AC power that is synchronized to the household electricity grid, and a communication interface for communicating with at least one of the EMS or the smart phone application.

17. The energy coupling system according to claim 16, wherein:
at least one of the EMS or the smart phone application controls the AC-to-AC power converter to perform one or more operations including:
turning on the AC-to-AC power converter;
turning off the AC-to-AC power converter;
controlling an output power;
retrieving the output power;
retrieving an amplitude and a frequency of the AC output from the electric vehicle;
retrieving an amplitude and a frequency of the V2L AC power;
retrieving a current value of the AC output from the electric vehicle;
retrieving a current value of the V2L AC power; and
retrieving alarms of the AC-to-AC power converter.

18. The energy coupling system according to claim 10, wherein the one or more processors are further configured to:
turn on the AC-to-AC power converter to supply the V2L AC power to the electricity grid through the household electricity grid.

* * * * *